US007840896B2

(12) United States Patent
Tien et al.

(10) Patent No.: US 7,840,896 B2
(45) Date of Patent: Nov. 23, 2010

(54) DEFINITION AND INSTANTIATION OF METRIC BASED BUSINESS LOGIC REPORTS

(75) Inventors: Ian Tien, Seattle, WA (US); Chen-I Lim, Bellevue, WA (US); Corey Hulen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 981 days.

(21) Appl. No.: 11/393,115

(22) Filed: Mar. 30, 2006

(65) Prior Publication Data

US 2007/0239660 A1 Oct. 11, 2007

(51) Int. Cl.
*G06F 17/00* (2006.01)
(52) U.S. Cl. .................................. 715/243; 715/273
(58) Field of Classification Search ................ 715/243, 715/244, 245, 273; 700/91, 92
See application file for complete search history.

(56) References Cited

U.S. PATENT DOCUMENTS

| | | | | |
|---|---|---|---|---|
| 5,018,077 | A | 5/1991 | Healey | 715/509 |
| 5,233,552 | A | 8/1993 | Brittan | 708/445 |
| 5,253,362 | A | 10/1993 | Nolan | 707/1 |
| 5,404,295 | A | 4/1995 | Katz et al. | 715/231 |
| 5,473,747 | A | 12/1995 | Bird | 715/848 |
| 5,675,553 | A | 10/1997 | O'Brien, Jr. et al. | 367/135 |
| 5,680,636 | A | 10/1997 | Levine | 715/512 |
| 5,758,351 | A | 5/1998 | Gibson et al. | 707/104 |
| 5,779,566 | A * | 7/1998 | Wilens | 473/407 |
| 5,797,136 | A | 8/1998 | Boyer et al. | 707/2 |
| 5,832,504 | A | 11/1998 | Tripathi et al. | 715/235 |
| 5,845,270 | A | 12/1998 | Schatz | 706/11 |
| 5,926,794 | A | 7/1999 | Fethe | 705/11 |
| 5,943,666 | A | 8/1999 | Kleewein et al. | 1/1 |
| 5,956,691 | A | 9/1999 | Powers | 705/4 |
| 6,012,044 | A | 1/2000 | Maggioncalda et al. | 705/36 R |
| 6,023,714 | A | 2/2000 | Hill et al. | 715/235 |
| 6,115,705 | A | 9/2000 | Larson | 1/1 |
| 6,119,137 | A | 9/2000 | Smith et al. | 715/234 |
| 6,141,655 | A | 10/2000 | Johnson | 707/2 |
| 6,163,779 | A | 12/2000 | Mantha | 707/100 |
| 6,182,022 | B1 | 1/2001 | Mayle et al. | 702/182 |
| 6,216,066 | B1 | 4/2001 | Goebel et al. | 701/29 |

(Continued)

FOREIGN PATENT DOCUMENTS

EP 1 128 299 A1 8/2001

(Continued)

OTHER PUBLICATIONS

U.S. Official Action mailed Dec. 24, 2008 in U.S. Appl. No. 11/624,171.

(Continued)

*Primary Examiner*—Laurie Ries
(74) *Attorney, Agent, or Firm*—Merchant & Gould

(57) ABSTRACT

Groups of subordinate report definitions are determined for selected scorecard metrics based on suitable report type and layout features. A list comprising the available reports is assigned to each source metric enabling association of the groups across metrics. A context of the scorecard is passed to a physical instantiation of the group of reports to affect their behavior. Report presentation, queries, and the like may be performed using the assigned definition list(s).

20 Claims, 9 Drawing Sheets

U.S. PATENT DOCUMENTS

| | | | |
|---|---|---|---|
| 6,230,310 B1 | 5/2001 | Arrouye et al. | 717/136 |
| 6,233,573 B1 | 5/2001 | Bair | 707/3 |
| 6,249,784 B1 | 6/2001 | Macke | 707/3 |
| 6,308,206 B1 | 10/2001 | Singh | 709/223 |
| 6,321,206 B1 | 11/2001 | Honarvar | 705/7 |
| 6,341,277 B1 | 1/2002 | Coden et al. | 1/1 |
| 6,345,279 B1 | 2/2002 | Li et al. | 715/202 |
| 6,389,434 B1 | 5/2002 | Rivette | 715/512 |
| 6,393,406 B1 | 5/2002 | Eder | 705/7 |
| 6,421,670 B1 | 7/2002 | Fourman | 707/10 |
| 6,493,733 B1 | 12/2002 | Pollack | 715/513 |
| 6,516,324 B1 | 2/2003 | Jones | 707/104.1 |
| 6,519,603 B1 | 2/2003 | Bays | 707/102 |
| 6,529,215 B2 | 3/2003 | Golovchinsky et al. | 715/764 |
| 6,563,514 B1 | 5/2003 | Samar | 715/711 |
| 6,578,004 B1 | 6/2003 | Cimral | 705/7 |
| 6,601,233 B1 | 7/2003 | Underwood | 717/102 |
| 6,628,312 B1 | 9/2003 | Rao | 715/853 |
| 6,633,889 B2 | 10/2003 | Dessloch et al. | 1/1 |
| 6,658,432 B1 | 12/2003 | Alavi et al. | 707/104.1 |
| 6,665,577 B2 | 12/2003 | Onyshkevych et al. | 700/130 |
| 6,677,963 B1 | 1/2004 | Mani et al. | 715/764 |
| 6,687,878 B1 | 2/2004 | Eintracht | 712/512 |
| 6,763,134 B2 | 7/2004 | Cooper et al. | 382/162 |
| 6,772,137 B1 | 8/2004 | Hurwood et al. | 707/2 |
| 6,775,675 B1 | 8/2004 | Nwabueze | 707/100 |
| 6,831,575 B2 | 12/2004 | Wu et al. | 341/50 |
| 6,831,668 B2 | 12/2004 | Cras | 715/853 |
| 6,842,176 B2 | 1/2005 | Sang'udi | 345/440 |
| 6,850,891 B1 | 2/2005 | Forman | 705/7 |
| 6,854,091 B1 | 2/2005 | Beaudoin | 715/854 |
| 6,859,798 B1 | 2/2005 | Bedell et al. | 706/45 |
| 6,867,764 B2 | 3/2005 | Ludtke | 345/173 |
| 6,874,126 B1 | 3/2005 | Lapidous | 715/711 |
| 6,898,603 B1 | 5/2005 | Petculescu | 707/101 |
| 6,900,808 B2 | 5/2005 | Lassiter | 345/440 |
| 6,959,306 B2 | 10/2005 | Nwabueze | 707/104.1 |
| 6,963,826 B2 | 11/2005 | Hanaman et al. | 703/2 |
| 6,968,312 B1 | 11/2005 | Jordan | 705/7 |
| 6,973,616 B1 | 12/2005 | Cottrille | 715/512 |
| 6,976,086 B2 | 12/2005 | Sadeghi et al. | 709/236 |
| 6,988,076 B2 | 1/2006 | Ouimet | 705/7 |
| 6,995,768 B2 | 2/2006 | Jou | 345/440 |
| 7,013,285 B1 | 3/2006 | Rebane | 705/10 |
| 7,015,911 B2* | 3/2006 | Shaughnessy et al. | 345/440 |
| 7,027,051 B2 | 4/2006 | Alford et al. | 345/440 |
| 7,043,524 B2 | 5/2006 | Shah et al. | 709/203 |
| 7,058,638 B2 | 6/2006 | Singh | 707/100 |
| 7,181,417 B1 | 2/2007 | Langseth et al. | 705/26 |
| 7,302,431 B1 | 11/2007 | Apollonsky et al. | 1/1 |
| 7,340,448 B2 | 3/2008 | Santosuosso | 1/1 |
| 7,349,862 B2 | 3/2008 | Palmer et al. | 705/7 |
| 7,383,247 B2 | 6/2008 | Li et al. | 1/1 |
| 7,412,398 B1 | 8/2008 | Bailey | 705/10 |
| 7,433,876 B2 | 10/2008 | Spivack et al. | 1/1 |
| 7,440,976 B2 | 10/2008 | Chan et al. | 707/203 |
| 7,496,852 B2 | 2/2009 | Eichorn et al. | 715/764 |
| 7,509,343 B1 | 3/2009 | Washburn et al. | 707/104.1 |
| 7,548,912 B2 | 6/2009 | Gideoni et al. | 1/1 |
| 7,587,665 B2 | 9/2009 | Crow et al. | 715/212 |
| 7,599,848 B2 | 10/2009 | Wefers et al. | 705/7 |
| 7,613,625 B2 | 11/2009 | Heinrich | 705/7 |
| 7,702,779 B1 | 4/2010 | Gupta et al. | 709/224 |
| 7,716,571 B2 | 5/2010 | Tien et al. | 715/212 |
| 7,716,592 B2 | 5/2010 | Tien et al. | 715/744 |
| 7,752,301 B1 | 7/2010 | Maiocco et al. | 709/224 |
| 2001/0004256 A1 | 6/2001 | Iwata et al. | 345/204 |
| 2001/0051835 A1* | 12/2001 | Cline | 700/91 |
| 2001/0054046 A1 | 12/2001 | Mikhailov et al. | 707/500 |
| 2002/0038217 A1 | 3/2002 | Young | 705/1 |
| 2002/0049621 A1 | 4/2002 | Bruce | 705/10 |
| 2002/0052740 A1 | 5/2002 | Charlesworth | 704/220 |
| 2002/0052862 A1 | 5/2002 | Scott et al. | 707/1 |
| 2002/0059267 A1 | 5/2002 | Shah | 707/100 |
| 2002/0078175 A1 | 6/2002 | Wallace | 709/200 |
| 2002/0087272 A1 | 7/2002 | Mackie | 702/14 |
| 2002/0091737 A1 | 7/2002 | Markel | 715/234 |
| 2002/0099578 A1 | 7/2002 | Eicher et al. | 705/7 |
| 2002/0112171 A1 | 8/2002 | Ginter et al. | 713/185 |
| 2002/0133368 A1 | 9/2002 | Strutt et al. | 705/1 |
| 2002/0147803 A1 | 10/2002 | Dodd et al. | 709/223 |
| 2002/0169658 A1 | 11/2002 | Adler | 705/10 |
| 2002/0169799 A1 | 11/2002 | Voshell | 707/503 |
| 2002/0177784 A1 | 11/2002 | Shekhar | 600/519 |
| 2002/0194042 A1 | 12/2002 | Sands | 705/7 |
| 2002/0194090 A1 | 12/2002 | Gagnon et al. | 705/27 |
| 2002/0194329 A1 | 12/2002 | Alling | 709/224 |
| 2003/0004742 A1 | 1/2003 | Palmer et al. | 705/1 |
| 2003/0014290 A1* | 1/2003 | McLean et al. | 705/7 |
| 2003/0014488 A1 | 1/2003 | Dalal et al. | 709/204 |
| 2003/0028419 A1 | 2/2003 | Monaghan | 705/10 |
| 2003/0040936 A1 | 2/2003 | Nader et al. | 705/1 |
| 2003/0055731 A1* | 3/2003 | Fouraker et al. | 705/22 |
| 2003/0061132 A1 | 3/2003 | Yu et al. | 705/30 |
| 2003/0069773 A1 | 4/2003 | Hladik et al. | 705/7 |
| 2003/0069824 A1* | 4/2003 | Menninger | 705/37 |
| 2003/0078830 A1* | 4/2003 | Wagner et al. | 705/10 |
| 2003/0093423 A1 | 5/2003 | Larason et al. | 707/5 |
| 2003/0110249 A1 | 6/2003 | Buus et al. | 709/224 |
| 2003/0144868 A1 | 7/2003 | MacIntyre et al. | 705/1 |
| 2003/0146937 A1 | 8/2003 | Lee | 345/781 |
| 2003/0182181 A1 | 9/2003 | Kirkwood | 705/11 |
| 2003/0187675 A1 | 10/2003 | Hack | 705/7 |
| 2003/0204430 A1 | 10/2003 | Kalmick et al. | 705/8 |
| 2003/0204487 A1 | 10/2003 | Sssv | 707/100 |
| 2003/0212960 A1 | 11/2003 | Shaughnessy et al. | 715/526 |
| 2003/0225604 A1 | 12/2003 | Casati et al. | 705/7 |
| 2003/0226107 A1 | 12/2003 | Pelegri-Llopart | 707/501.1 |
| 2003/0236732 A1 | 12/2003 | Cimral et al. | 705/36 |
| 2004/0030741 A1 | 2/2004 | Wolton et al. | 709/202 |
| 2004/0030795 A1 | 2/2004 | Hesmer et al. | 709/231 |
| 2004/0033475 A1 | 2/2004 | Mizuma et al. | 434/219 |
| 2004/0044678 A1 | 3/2004 | Kalia et al. | 707/102 |
| 2004/0059518 A1 | 3/2004 | Rothschild | 702/18 |
| 2004/0064293 A1 | 4/2004 | Hamilton et al. | 702/182 |
| 2004/0066782 A1 | 4/2004 | Nassar | 370/389 |
| 2004/0068429 A1 | 4/2004 | MacDonald | 705/10 |
| 2004/0083246 A1 | 4/2004 | Kahlouche et al. | 708/105 |
| 2004/0093296 A1 | 5/2004 | Phelan et al. | 705/36 R |
| 2004/0102926 A1 | 5/2004 | Adendorff | 702/182 |
| 2004/0117731 A1 | 6/2004 | Blyashov | 715/507 |
| 2004/0119752 A1 | 6/2004 | Beringer et al. | 345/779 |
| 2004/0128150 A1 | 7/2004 | Lundegren | 705/1 |
| 2004/0135826 A1 | 7/2004 | Pickering | 345/860 |
| 2004/0138944 A1 | 7/2004 | Whitacre | 705/11 |
| 2004/0162772 A1 | 8/2004 | Lewis | 705/34 |
| 2004/0164983 A1 | 8/2004 | Khozai | 345/440 |
| 2004/0172323 A1 | 9/2004 | Stamm | 705/10 |
| 2004/0183800 A1 | 9/2004 | Peterson | 345/440 |
| 2004/0199541 A1 | 10/2004 | Goldberg et al. | 707/104.1 |
| 2004/0204913 A1 | 10/2004 | Mueller et al. | 702/188 |
| 2004/0210574 A1 | 10/2004 | Aponte et al. | 707/5 |
| 2004/0215626 A1 | 10/2004 | Colossi et al. | 715/500 |
| 2004/0225571 A1 | 11/2004 | Urali | 705/26 |
| 2004/0225955 A1 | 11/2004 | Ly | 715/500 |
| 2004/0230463 A1 | 11/2004 | Boivin | 705/7 |
| 2004/0230471 A1 | 11/2004 | Putnam | 705/10 |
| 2004/0249482 A1 | 12/2004 | Abu El Ata et al. | 700/44 |
| 2004/0252134 A1 | 12/2004 | Bhatt et al. | 345/619 |
| 2004/0254860 A1 | 12/2004 | Wagner et al. | 705/27 |
| 2004/0260582 A1 | 12/2004 | King | 705/7 |
| 2004/0260717 A1 | 12/2004 | Albornoz et al. | 707/102 |
| 2004/0268228 A1 | 12/2004 | Croney et al. | 715/255 |
| 2005/0012743 A1 | 1/2005 | Kapler et al. | 345/419 |

| | | | |
|---|---|---|---|
| 2005/0039119 A1 | 2/2005 | Parks et al. | 715/515 |
| 2005/0049894 A1 | 3/2005 | Cantwell et al. | 705/1 |
| 2005/0055257 A1 | 3/2005 | Senturk et al. | 705/8 |
| 2005/0060048 A1 | 3/2005 | Pierre | 700/28 |
| 2005/0060325 A1 | 3/2005 | Bakalash | 707/100 |
| 2005/0065967 A1 | 3/2005 | Schuetze et al. | 707/102 |
| 2005/0071737 A1 | 3/2005 | Adendorff | 705/10 |
| 2005/0091093 A1 | 4/2005 | Bhaskaran | 705/7 |
| 2005/0091253 A1 | 4/2005 | Cragun | 707/102 |
| 2005/0091263 A1 | 4/2005 | Wallace | 707/102 |
| 2005/0097438 A1 | 5/2005 | Jacobson | 715/500.1 |
| 2005/0097517 A1 | 5/2005 | Goin et al. | 717/124 |
| 2005/0108271 A1 | 5/2005 | Jacobson | 715/202 |
| 2005/0114241 A1 | 5/2005 | Hirsch | 705/35 |
| 2005/0114801 A1 | 5/2005 | Yang | 715/961 |
| 2005/0149558 A1 | 7/2005 | Zhuk | 707/104.1 |
| 2005/0149852 A1 | 7/2005 | Bleicher | 715/501.1 |
| 2005/0154628 A1 | 7/2005 | Eckart et al. | 705/10 |
| 2005/0160356 A1 | 7/2005 | Albornoz | 715/512 |
| 2005/0171835 A1 | 8/2005 | Mook | 705/1 |
| 2005/0198042 A1 | 9/2005 | Davis | 707/10 |
| 2005/0209948 A1 | 9/2005 | Ballow et al. | 705/36 |
| 2005/0216831 A1 | 9/2005 | Guzik et al. | 715/513 |
| 2005/0228880 A1 | 10/2005 | Champlin | 709/224 |
| 2005/0240467 A1 | 10/2005 | Eckart | 705/10 |
| 2005/0256825 A1 | 11/2005 | Dettinger et al. | 707/1 |
| 2005/0262051 A1 | 11/2005 | Dettinger et al. | 707/3 |
| 2005/0272022 A1 | 12/2005 | Montz, Jr. et al. | 434/322 |
| 2005/0273762 A1 | 12/2005 | Lesh | 715/115 |
| 2005/0289452 A1 | 12/2005 | Kashi | 715/512 |
| 2006/0004555 A1 | 1/2006 | Jones | 703/6 |
| 2006/0004731 A1 | 1/2006 | Seibel et al. | 707/3 |
| 2006/0009990 A1 | 1/2006 | McCormick | 705/1 |
| 2006/0010032 A1 | 1/2006 | Eicher et al. | 705/10 |
| 2006/0010164 A1 | 1/2006 | Netz et al. | 707/104.1 |
| 2006/0020531 A1 | 1/2006 | Veeneman et al. | 705/35 |
| 2006/0036455 A1 | 2/2006 | Prasad | 715/1 |
| 2006/0059107 A1 | 3/2006 | Elmore et al. | 705/64 |
| 2006/0074789 A1 | 4/2006 | Capotosto et al. | 705/35 |
| 2006/0085444 A1 | 4/2006 | Sarawgi et al. | 707/100 |
| 2006/0089868 A1 | 4/2006 | Griller et al. | 705/10 |
| 2006/0089894 A1 | 4/2006 | Balk et al. | 705/35 |
| 2006/0089939 A1 | 4/2006 | Broda et al. | 707/100 |
| 2006/0095915 A1 | 5/2006 | Clater | 718/100 |
| 2006/0111921 A1 | 5/2006 | Chang et al. | 705/1 |
| 2006/0112123 A1 | 5/2006 | Clark et al. | 707/101 |
| 2006/0112130 A1 | 5/2006 | Lowson | 707/102 |
| 2006/0123022 A1 | 6/2006 | Bird | 707/100 |
| 2006/0136830 A1* | 6/2006 | Martlage et al. | 715/745 |
| 2006/0161471 A1 | 7/2006 | Hulen et al. | 705/10 |
| 2006/0167704 A1 | 7/2006 | Nicholls et al. | 705/1 |
| 2006/0178897 A1 | 8/2006 | Fuchs | 705/1 |
| 2006/0178920 A1 | 8/2006 | Muell | 705/8 |
| 2006/0195424 A1 | 8/2006 | Wiest et al. | 707/3 |
| 2006/0206392 A1 | 9/2006 | Rice, Jr. et al. | 705/26 |
| 2006/0229925 A1 | 10/2006 | Chalasani et al. | 705/8 |
| 2006/0233348 A1 | 10/2006 | Cooper | 379/265.06 |
| 2006/0235778 A1 | 10/2006 | Razvi et al. | 705/35 |
| 2006/0253475 A1 | 11/2006 | Stewart et al. | 707/100 |
| 2006/0265377 A1 | 11/2006 | Raman et al. | 707/9 |
| 2006/0282819 A1 | 12/2006 | Graham et al. | 717/113 |
| 2007/0021992 A1 | 1/2007 | Konakalla | 705/7 |
| 2007/0033129 A1 | 2/2007 | Coates | 705/36 R |
| 2007/0038934 A1 | 2/2007 | Fellman | 715/700 |
| 2007/0050237 A1 | 3/2007 | Tien et al. | 705/1 |
| 2007/0055688 A1 | 3/2007 | Blattner | 707/102 |
| 2007/0112607 A1 | 5/2007 | Tien et al. | 705/7 |
| 2007/0143161 A1 | 6/2007 | Tien et al. | 705/7 |
| 2007/0143174 A1 | 6/2007 | Tien et al. | 705/11 |
| 2007/0143175 A1 | 6/2007 | Tien et al. | 705/11 |
| 2007/0156680 A1 | 7/2007 | Tien et al. | 707/6 |
| 2007/0174330 A1 | 7/2007 | Fox et al. | 707/102 |
| 2007/0234198 A1 | 10/2007 | Tien et al. | 715/512 |
| 2007/0239573 A1 | 10/2007 | Tien et al. | 705/35 |
| 2007/0254740 A1 | 11/2007 | Tien et al. | 463/42 |
| 2007/0255681 A1 | 11/2007 | Tien et al. | 707/2 |
| 2007/0260625 A1 | 11/2007 | Tien et al. | 707/101 |
| 2007/0265863 A1 | 11/2007 | Tien et al. | 705/1 |
| 2007/0266042 A1 | 11/2007 | Hsu et al. | 707/102 |
| 2008/0005064 A1 | 1/2008 | Sarukkai | 707/3 |
| 2008/0059441 A1 | 3/2008 | Gaug et al. | 707/4 |
| 2008/0172287 A1 | 7/2008 | Tien et al. | 705/10 |
| 2008/0172348 A1 | 7/2008 | Tien et al. | 706/12 |
| 2008/0172414 A1 | 7/2008 | Tien et al. | 707/104.1 |
| 2008/0172629 A1 | 7/2008 | Tien et al. | 715/771 |
| 2008/0183564 A1 | 7/2008 | Tien et al. | 705/11 |
| 2008/0184099 A1 | 7/2008 | Tien et al. | 715/209 |
| 2008/0184130 A1 | 7/2008 | Tien et al. | 715/745 |
| 2008/0189632 A1 | 8/2008 | Tien et al. | 715/764 |
| 2008/0189724 A1 | 8/2008 | Tien et al. | 719/329 |
| 2008/0288889 A1* | 11/2008 | Hunt et al. | 715/810 |

FOREIGN PATENT DOCUMENTS

| | | |
|---|---|---|
| EP | 1 050 829 A2 | 3/2006 |
| WO | WO 97/31320 A1 | 8/1997 |
| WO | WO 01/65349 A1 | 9/2001 |
| WO | WO 01/69421 A2 | 9/2001 |
| WO | WO 01/69421 A3 | 9/2001 |
| WO | WO 03/037019 A1 | 5/2003 |
| WO | WO 01/01206 A2 | 1/2004 |
| WO | WO 01/01206 A3 | 1/2004 |
| WO | WO 2004/114177 A2 | 12/2004 |
| WO | WO 2004/114177 A3 | 12/2004 |
| WO | WO 2005/062201 A1 | 7/2005 |
| WO | WO 2005/101233 A1 | 10/2005 |

OTHER PUBLICATIONS

Kraynak, "Absolute Beginner's Guide to Microsoft Office Excel 2003", Que, Sep. 2003, 32 pp.

U.S. Official Action mailed May 28, 2009 in U.S. Appl. No. 11/214,678.

U.S. Official Action mailed Jun. 19, 2009 in U.S. Appl. No. 11/408,450.

"Business Analysis with OLAP", Netways, http://www.netways.com/newsletter.olap.html, printed Mar. 7, 2006, 3 pp.

"Centralization and Optimization of Performance Metrics, Data Sources, and Analysis Activities", 2005 Computerworld Honors Case Study, http://www.cwhonors.org/laureates/Business/20055240.pdf, printed Mar. 7, 2006, 4 pp.

"Chapter 13—OLAP Services", SQL Server 7.0 Resource Guide, 2006 Microsoft Corporation, http://www.microsoft.com/technet/prodtechnol/sql/70/reskit/part9/sqc12.mspx, printed Mar. 6, 2006, 18 pp.

"Cognos 8 Business Intelligence Overview", Cognos Incorporated, http://www.cognos.com/products/cognos8businessintelligence/index.html, printed Jan. 11, 2006, 1 pp.

"CorVu Products", Seabrook, http://www.seabrook.ie/corvu.htm#corvurapidscorecard, printed Mar. 7, 2006, 3 pp.

"Enhanced Vendor Scorecards Vendor Documentation", Publix Super Markets, Inc., copyright 2003, revised date Feb. 9, 2004, http://my.datexx.com/www/customer/p14/Vendor%20EVS%20Documentation.pdf, 25 pp.

"Epicor Vantage: Introducing the Next Generation Global Enterprise Resource Planning Software", Epicor Vantage, http://www.scala.com.cn/downloads/vantage/vantage_60_page.pdf, printed Jan. 12, 2006, 60 pp.

"Extend Business Scorecard Manager 2005", ProClarity, http://www.proclarity.com/products/clients_scorecardmanager.asp, printed Jan. 11, 2006, 2 pp.

"MicroStrategy: Best in Business Intelligence", MicroStrategy Inc., http://www.microstrategy.com/Software/Products/User-Interfaces/Web, printed Jan. 11, 2006, 3 pp.

"OutlookSoft CPM: A Unified Corporate Performance Management Solution", OutlookSoft Corporation, http://www.outlooksoft.com/product.index.htm, printed Jan. 11, 2006, 2 pp.

"SBM Solutions: Product Guide", SBM Associates, http://www.productcosting.com/prodguide.htm, printed Feb. 28, 2006, 1 pp.

"Scorecarding with Cognos® Metrics Manager", Cognos, http://www.cognos.com/pdfs/factsheets/fs_scorcarding_with_cognos_metrics_manager.pdf, printed Mar. 7, 2006, 4 pp.

Badii, Atta et al., "Information Management and Knowledge Integration for Enterprise Innovation", Logistics Information Management, vol. 16, No. 2, 2003, http://www.emeraldinsight.com/Insight/ViewContentServlet?Filename=Published/EmeraldFullTextArticle/Pdf/0880160205.pdf, pp. 145-155.

Bajwa, Deepinder S. et al., "An Empirical Assessment of the Adoption and Use of Collaboration Information Technologies in the U.S., Australia, and Hong Kong", http://dsslab.sims.monash.edu.au/dss2004/proceedings/pdf/07_Bajwa_Lewis_Pervan_Lai.pdf, printed Jan. 12, 2006, copyright 2004, pp. 60-69.

Bird, Steven et al., "Annotation Graphs as a Framework for Multidimensional Linguistic Data Analysis", http:///acl.ldc.upenn.educ/W/W99/W99-0301.pdf, printed Jan. 12, 2006, pp. 1-10.

Calame, Paul et al., "Cockpit: Decision Support Tool for Factory Operations and Supply Chain Management", Intel Technology Journal Q1, 2000 Intel Corporation, http://developer.intel.com/technology/itj/q12000/pdf.cockpit.pdf, pp. 1-13.

Elmanova, Natalia, "Implementing OLAP in Delphi Applications", http://www.only4gurus.net/miscellaneous/implementing_olap_in_delphi_a.doc, printed Mar. 6, 2006, 19 pp.

Lebow, David G. et al., "HyLighter: An Effective Interactive Annotation Innovation for Distance Education", http://wwwuwex.edu/disted/conference/Resource_library/proceedings/04_1344.pdf, printed Jan. 12, 2006, 5 pp.

Rother, Kristian et al., "Multidimensional Data Integration of Protein Annotations", Springer-Verlag GmbH, http://www.springerlink.com/(3riocx450rr2iv55x2txum55)/app/home/contribution.asp?referrer=parent&backto=issue,11,15;journal,827,2337;linkingpublicationresults,1:105633,1, printed Jan. 12, 2006, 2 pp.

U.S. Appl. No. 11/039,714, filed Jan. 1, 2005 entitled "System and Method for Multi-Dimensional Average-Weighted Banding Status and Scoring".

U.S. Appl. No. 11/214,678, filed Aug. 30, 2005 entitled "Visual Designer for Multi-Dimensional Business Logic".

U.S. Appl. No. 11/280,548, filed Nov. 16, 2005 entitled "Score-Based Alerting in Business Logic".

U.S. Appl. No. 11/313,324, filed Dec. 21, 2005 entitled "Application Independent Rendering of Scorecard Metrics".

U.S. Appl. No. 11/313,327, filed Dec. 21, 2005 entitled "Repeated Inheritance of Heterogeneous Business Metrics".

U.S. Appl. No. 11/313,390, filed Dec. 21, 2005 entitled "Disconnected Authoring of Business Definitions".

U.S. Appl. No. 11/313,899, filed Dec. 21, 2005 entitled "Centralized Model for Coordinating Update of Multiple Reports".

U.S. Appl. No. 11/393,019, filed Mar. 30, 2006 entitled "Automated Generation of Dashboards for Scorecard Metrics and Subordinate Reporting".

U.S. Appl. No. 11/393,335, filed Mar. 30, 2006 entitled "MultiDimensional Metrics-Based Annotation".

U.S. Appl. No. 11/408,450, filed Apr. 21, 2006 entitled "Grouping and Display of Logically Defined Reports".

U.S. Appl. No. 11/412,434, filed Apr. 27, 2006 entitled "Multidimensional Scorecard Header Definition".

U.S. Appl. No. 11/412,458, filed Apr. 27, 2006 entitled "Concerted Coordination of Multi-Dimensional Scorecards".

U.S. Appl. No. 11/412,499, filed Apr. 27, 2006 entitled "Automated Determination of Relevant Slice in Multidimensional Data Sources".

Sanders, Paul, "SQL Server 2005; Real-Time Business Intelligence Using Analysis Services", Microsoft SQL Server TechCenter, Apr. 1, 2005; http://www.microsoft.com/technet/prodtechnol/sql/2005/rtbissas.mspx, pp. 1-9.

Acharya, Sharad, "Pattern Language for Data Driven Presentation Layer for Dynamic and Configurable Web Systems," Version: Conference Draft, Jul. 26, 2004, pp. 1-33, http://hillside.net/plop/2004/papers/sacharya0/PLoP2004_sacharya0_0.pdf.

"Data Driven Components," Java Developers Journal, SYS-CON Media, Inc. 2004, http://www2.sys-con.com/itsg/virtualcd/Java/archives/0405/hyrkas/index.html, 7 pp.

"Hyperion System 9 BI+Enterprise Metrics," A Hyperion Data Sheet, Hyperion Solutions Corporation Worldwide Headquarters, Oct. 2006, http://www.hyperion.com/products/resources_library/product_collateral/EnterpriseMetrics.pdf, pp. 1-2.

"Products: PilotWorks," Products: PilotWorks—Scorecard, 2006 Pilot Software, pp. 1-3.

Martinsons, Maris; Davison, Robert; Tse, Dennis; "The Balanced Scorecard: A Foundation for the Strategic Management of Information Systems," University of Hong Kong, Sep. 28, 1998. http://teaching.fec.anu.edu.au/BUSN7040/Articles/Martinsons%20et%20al%201999%20DSS%20the%20balanced%20scorecard.pdf, 18 pp.

U.S. Office Action mailed Jul. 25, 2008 cited in U.S. Appl. No. 11/412,434.

U.S. Office Action mailed Sep. 5, 2008 cited in U.S. Appl. No. 11/280,548.

U.S. Office Action dated Nov. 24, 2008 cited in U.S. Appl. No. 11/214,678.

U.S. Official Action mailed May 28, 2009 in U.S. Appl. No. 11/280,548.

U.S. Official Action mailed Jun. 3, 2009 in U.S. Appl. No. 11/393,335.

John Wiley et al., "Power Point All-in-One Desk Reference for Dummies," Jan. 10, 2007.

U.S. Official Action mailed Oct. 21, 2009 in U.S. Appl. No. 11/280,548.

U.S. Official Action mailed Dec. 8, 2009 in U.S. Appl. No. 11/393,335.

U.S. Official Action mailed Dec. 14, 2009 in U.S. Appl. No. 11/393,019.

U.S. Official Action mailed Dec. 28, 2009 in U.S. Appl. No. 11/624,171.

U.S. Official Action mailed Jan. 15, 2010 in U.S. Appl. No. 11/408,450.

U.S. Official Action mailed Aug. 6, 2009 in U.S. Appl. No. 11/668,520.

U.S. Official Action mailed Sep. 1, 2009 in U.S. Appl. No. 11/412,434.

U.S. Official Action mailed Sep. 2, 2009 in U.S. Appl. No. 11/624,171.

U.S. Official Action mailed Sep. 30, 2009 in U.S. Appl. No. 11/214,678.

Chien et al., XML Document Versioning, SIGMOD Record, vol. 30, No. 3, Sep. 2001.

U.S. Official Action mailed Mar. 17, 2010 in U.S. Appl. No. 11/280,548.

U.S. Official Action mailed Mar. 30, 2010 in U.S. Appl. No. 11/313,390.

U.S. Official Action mailed Mar. 31, 2010 in U.S. Appl. No. 11/313,327.

U.S. Official Action mailed Apr. 1, 2010 in U.S. Appl. No. 11/313,899.

U.S. Official Action mailed Apr. 7, 2010 in U.S. Appl. No. 11/412,499.

Cognos Incorporated, "Scorecarding with Cognos Metrics Manager," Oct. 2004.

Charles Bloomfield, "Bringing the Balanced Scorecard to Life: The Microsoft Balanced Scorecard Framework," Microsoft Corporation White Paper, May 2002.

Mulins, Craig S., "Distributed Query Optimization Technical Support", Jul. 1996.

Callen, Daniel J. et al., "Consolidation of Query Results in a Multidatabase Environment: An Object Oriented Approach" IEEE, 1996.

U.S. Official Action mailed Apr. 14, 2010 in U.S. Appl. No. 11/313,324.

U.S. Official Action mailed Apr. 15, 2010 in U.S. Appl. No. 11/412,458.

U.S. Official Action mailed Apr. 23, 2010 in U.S. Appl. No. 11/214,678.

U.S. Official Action mailed May 12, 2010 in U.S. Appl. No. 11/624,171.

U.S. Official Action mailed May 26, 2010 in U.S. Appl. No. 11/393,335.

U.S. Official Action mailed May 26, 2010 in U.S. Appl. No. 11/668,520.

IndicatorBarometer; retrieved from <http://www.aiqsystems.com/docs/ref_7.pdf>, archived Oct. 15, 2004.

U.S. Official Action mailed Jan. 22, 2010 in U.S. Appl. No. 11/039,714.

U.S. Official Action mailed Feb. 3, 2010 in U.S. Appl. No. 11/668,530.

U.S. Office Action dated Feb. 18, 2009 cited in U.S. Appl. No. 11/412,434.

U.S. Official Action mailed Jul. 21, 2010 in U.S. Appl. No. 11/039,714.

Ergometrics.com Web Pages, Ergometrics, Feb.-Mar. 2000, Retrieved from Archive.org Jan. 25, 2007.

Arnold, Tom, Dashboard & Scorecard Software - Tools for Operations Management and Strategy Deployment, Sep. 18, 2002.

iDashes.net Web Pages, iDashes, Inc., May 2001, Retrieved from Archive.org Jan. 25, 2007.

U.S. Official Action mailed Aug. 4, 2010 in U.S. Appl. No. 11/280,548.

U.S. Official Action mailed Aug. 5, 2010 in U.S. Appl. No. 11/412,458.

U.S. Official Action mailed Aug. 10, 2010 in U.S. Appl. No. 11/623,818.

IBM WebSphere: Chapter 6 - Working with WebSphere Business Modeler, cited in U.S. Appl. No. 11/313,390 in OA dated Sep. 1, 2010, 20 pgs.

U.S. Official Action mailed Aug. 30, 2010 in U.S. Appl. No. 11/313,327.

U.S. Official Action mailed Sep. 1, 2010 in U.S. Appl. No. 11/313,390.

U.S. Official Action mailed Sep. 8, 2010 in U.S. Appl. No. 11/670,516.

U.S. Official Action mailed Sep. 9, 2010 in U.S. Appl. No. 11/412,499.

* cited by examiner

DEFINITION AND INSTANTIATION OF METRIC BASED BUSINESS LOGIC REPORTS

BACKGROUND

Key Performance Indicators, also known as KPI or Key Success Indicators (KSI), help an organization define and measure progress toward organizational goals. Once an organization has analyzed its mission, identified all its stakeholders, and defined its goals, it needs a way to measure progress toward those goals. Key Performance Indicators are used to provide those measurements.

Scorecards are used to provide detailed and summary analysis of KPIs and aggregated KPIs such as KPI groups, objectives, and the like. Scorecard calculations are typically specific to a defined hierarchy of the above mentioned elements, selected targets, and status indicator schemes. Business logic applications that generate, author, and analyze scorecards are typically enterprise applications with multiple users (subscribers), designers, and administrators. It is not uncommon, for organizations to provide their raw performance data to a third party and receive scorecard representations, analysis results, and similar reports.

In scorecard applications, being able to pass the context of a user's selection in a scorecard to a subordinate report provides increased efficiency and improved user experience. This feature can be seamless when the metrics and data are homogenous. However, it can be extremely difficult to have a single subordinate report updated appropriately when the metrics are heterogeneous.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Aspects are directed to determining suitable reports for selected scorecard metrics based on report type and associated layout. Groups of reports may be related across metrics, and assigned a list of available report definitions to the metrics based on the determination. Default report type suggestions may be modified by a subscriber in an editing mode. The list of available report definitions may be employed to generate report views, perform queries, and the like.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, determining suitable reports for selected scorecard metrics based on report type and associated layout and associating their definitions with the selected metrics enables scorecard configuration independent processing of heterogeneous metrics for report views. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
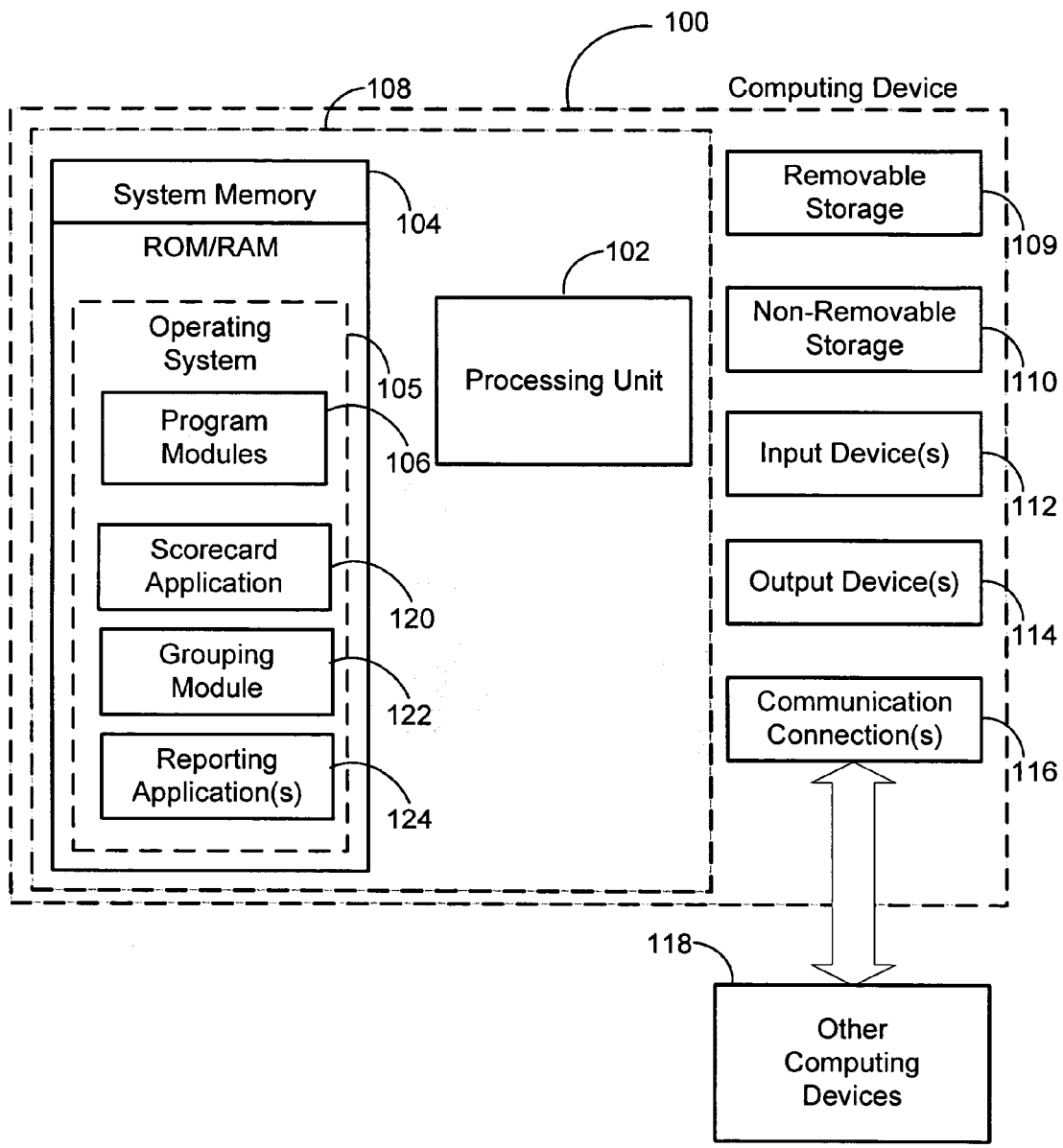
FIG. 1 is a block diagram of an exemplary computing operating environment.

Referring now to the drawings, aspects and an exemplary operating environment will be described. FIG. 1 and the following discussion are intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the embodiments includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as program modules 106, scorecard application 120, grouping module 122, and reporting application 124. Scorecard application 120 manages business evaluation methods, computes KPIs, and provides scorecard data to reporting applications. In some embodiments, scorecard application 120 may itself generate reports based on metric data.

Grouping module 122 manages determination of subordinate report definitions for selected scorecard metrics and assignment of available report lists (groups) to the metrics within scorecard application 120. Grouping module 122 may be an integrated part of scorecard application 120 or a separate application. Scorecard application 120, grouping module 122, and reporting application(s) 124 may communicate between themselves and with other applications running on computing device 100 or on other devices. Furthermore, any one of scorecard application 120, grouping module 122, and reporting application(s) 124 may be executed in an operating system other than operating system 105. This basic configuration is illustrated in FIG. 1 by those components within dashed line 108.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
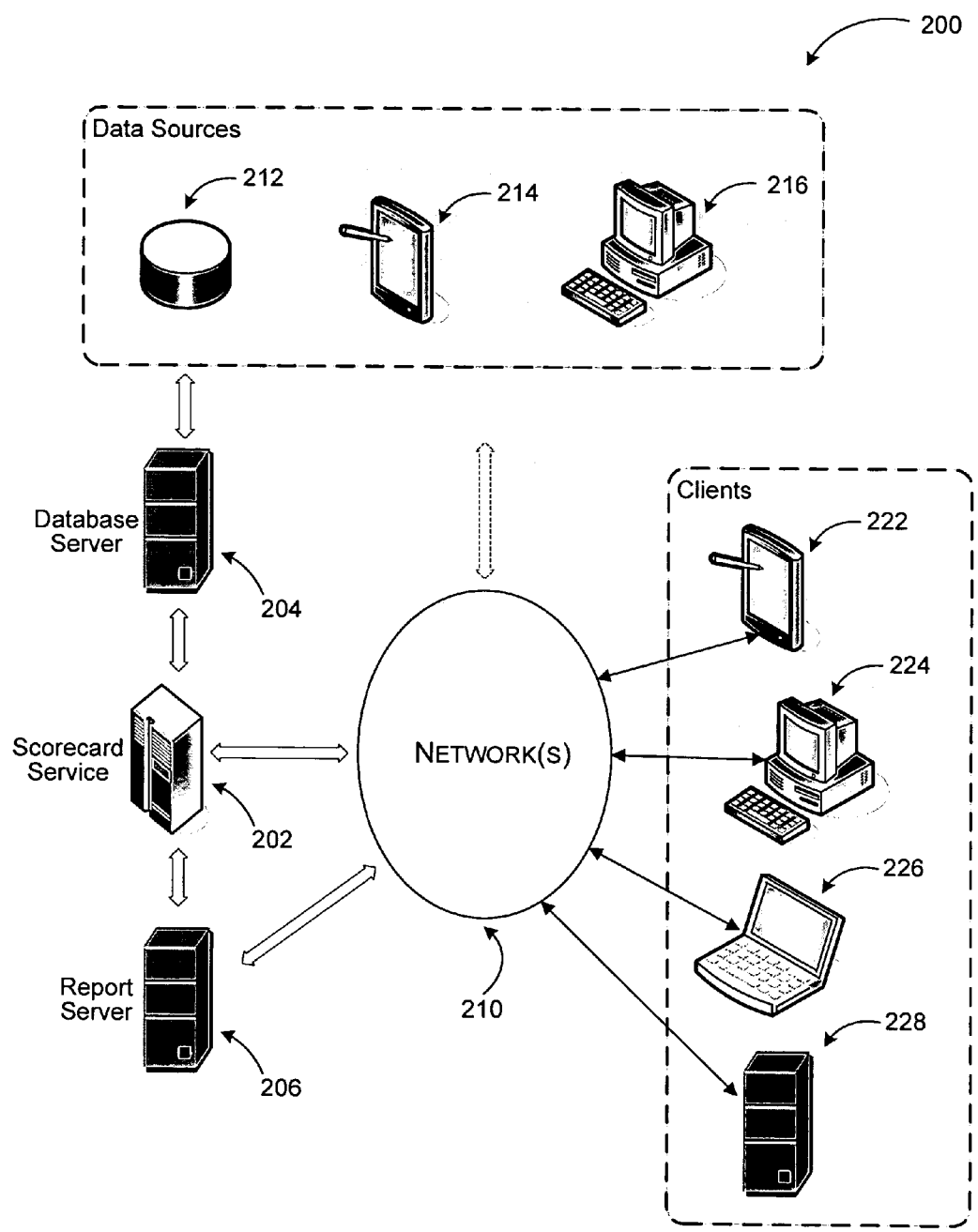
FIG. 2 illustrates a system where example embodiments may be implemented.

Referring to FIG. 2, a system where example embodiments may be implemented, is illustrated. System 200 may comprise any topology of servers, clients, Internet service providers, and communication media. Also, system 200 may have a static or dynamic topology. The term "client" may refer to a client application or a client device employed by a user to perform business logic operations. Scorecard service 202, database server 204, and report server 206 may also be one or more programs or a server machine executing programs associated with the server tasks. Both clients and application servers may be embodied as single device (or program) or a number of devices (programs). Similarly, data sources may include one or more data stores, input devices, and the like.

A business logic application may be run centrally on scorecard service 202 or in a distributed manner over several servers and/or client devices. Scorecard service 202 may include implementation of a number of information systems such as performance measures, business scorecards, and exception reporting. A number of organization-specific applications including, but not limited to, financial reporting, analysis, marketing analysis, customer service, and manufacturing planning applications may also be configured, deployed, and shared in system 200. In addition, the business logic application may also be run in one or more client devices and information exchanged over network(s) 210.

Data sources 212, 214, and 216 are examples of a number of data sources that may provide input to scorecard service 202 through database server 204. Additional data sources may include SQL servers, databases, non multi-dimensional data sources such as text files or EXCEL® sheets, multi-dimensional data source such as data cubes, and the like. Database server 204 may manage the data sources, optimize queries, and the like.

Users may interact with scorecard service 202 running the business logic application from client devices 222, 224, and 226 over network(s) 210. In one embodiment, additional applications that consume scorecard-based data may reside on scorecard service 202 or client devices 222, 224, and 226. Examples of such applications and their relation to the scorecard application are provided below in conjunction with FIG. 3.

Report server 206 may include reporting applications, such as charting applications, alerting applications, analysis applications, and the like. These applications may receive scorecard data from scorecard service 202 and provide reports directly or through scorecard service 202 to clients.

Network(s) 210 may include a secure network such as an enterprise network, or an unsecure network such as a wireless open network. Network(s) 210 provide communication between the nodes described above. By way of example, and not limitation, network(s) 210 may include wired media such as a wired network or direct-wired connection, and wireless media such as acoustic, RF, infrared and other wireless media.

Many other configurations of computing devices, applications, data sources, data distribution and analysis systems may be employed to implement a business logic application automatically generating dashboards with scorecard metrics and subordinate reporting.

Figure 3:
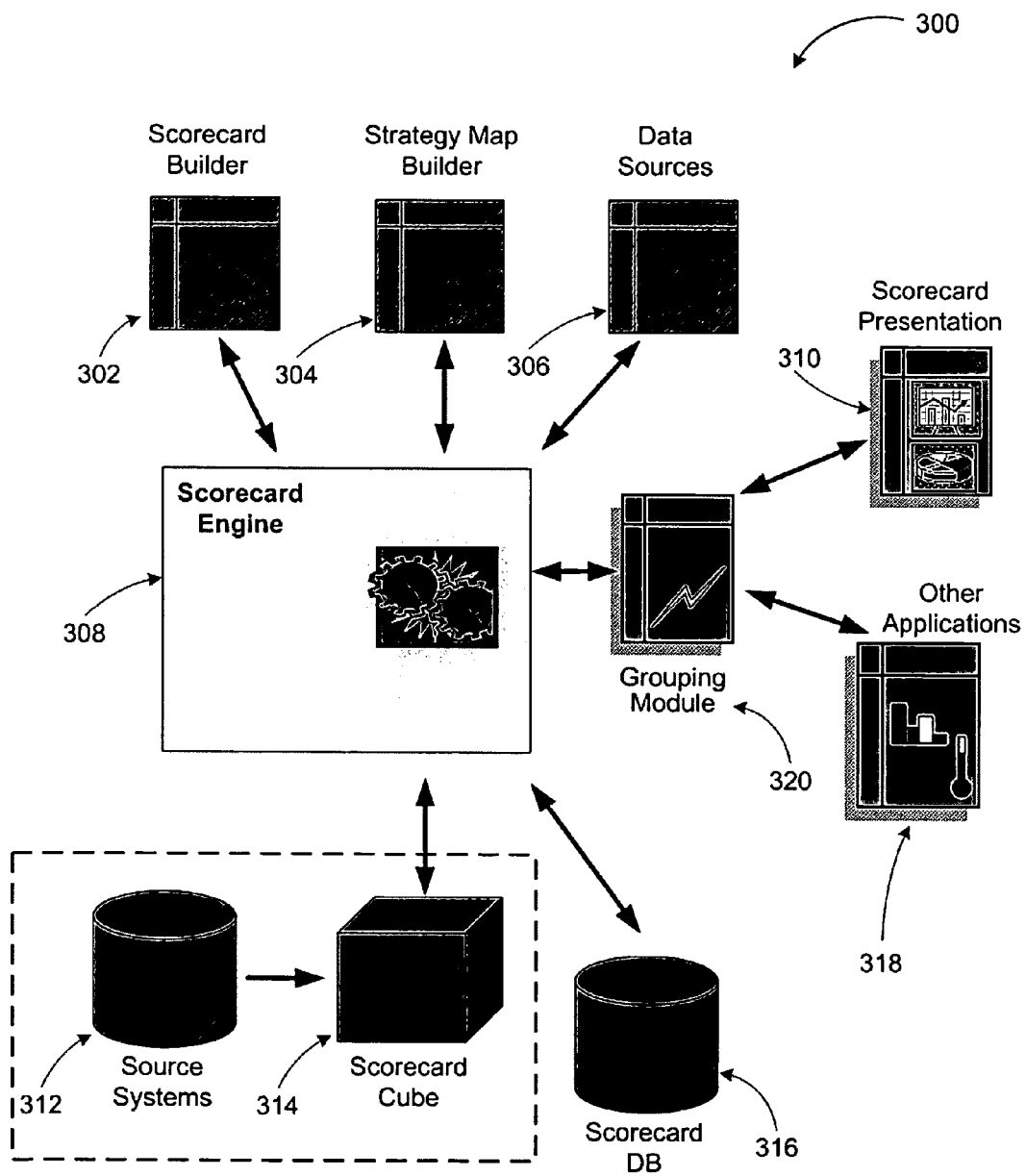
FIG. 3 illustrates an example scorecard architecture according to embodiments.

Now referring to FIG. 3, example scorecard architecture 300 is illustrated. Scorecard architecture 300 may comprise any topology of processing systems, storage systems, source systems, and configuration systems. Scorecard architecture 300 may also have a static or dynamic topology.

Scorecards are a simple method of evaluating organizational performance. The performance measures may vary from financial data such as sales growth to service information such as customer complaints. In a non-business environment, student performances and teacher assessments may be another example of performance measures that can employ scorecards for evaluating organizational performance. In the exemplary scorecard architecture 300, a core of the system is scorecard engine 308. Scorecard engine 308 may be an application that is arranged to evaluate performance metrics. Scorecard engine 308 may be loaded into a server, executed over a distributed network, executed in a client device, and the like.

In addition to performing scorecard calculation, scorecard engine may also provide report parameters associated with a scorecard to other applications 318. The report parameters may be determined based on a subscriber request or a user interface configuration. The user interface configuration may include a subscriber credential or a subscriber permission attribute. The report parameter may include a scorecard identifier, a scorecard view identifier, a row identifier, a column identifier, a page filter, a performance measure group identifier, or a performance measure identifier. The performance measure may be a KPI, a KPI group, or an objective. The page filter determines a period and an organizational unit for application of the scorecard calculations.

Data for evaluating various measures may be provided by a data source. The data source may include source systems 312, which provide data to a scorecard cube 314. Source systems 312 may include multi-dimensional databases such as an Online Analytical Processing (OLAP) database, other databases, individual files, and the like, that provide raw data for generation of scorecards. Scorecard cube 314 is a multi-dimensional database for storing data to be used in determining Key Performance Indicators (KPIs) as well as generated scorecards themselves. As discussed above, the multi-dimensional nature of scorecard cube 314 enables storage, use, and presentation of data over multiple dimensions such as compound performance indicators for different geographic areas, organizational groups, or even for different time intervals. Scorecard cube 314 has a bi-directional interaction with scorecard engine 308 providing and receiving raw data as well as generated scorecards.

Scorecard database 316 is arranged to operate in a similar manner to scorecard cube 314. In one embodiment, scorecard database 316 may be an external database providing redundant back-up database service.

Scorecard builder 302 may be a separate application, a part of the performance evaluation application, and the like. Scorecard builder 302 is employed to configure various parameters of scorecard engine 308 such as scorecard elements, default values for actuals, targets, and the like. Scorecard builder 302 may include a user interface such as a web service, a Graphical User Interface (GUI), and the like.

Strategy map builder 304 is employed for a later stage in scorecard generation process. As explained below, scores for KPIs and parent nodes such as Objective and Perspective may be presented to a user in form of a strategy map. Strategy map builder 304 may include a user interface for selecting graphical formats, indicator elements, and other graphical parameters of the presentation.

Data Sources 306 may be another source for providing raw data to scorecard engine 308. Data sources may be comprised of a mix of several multi-dimensional and relational databases or other Open Database Connectivity (ODBC)-accessible data source systems (e.g. Excel, text files, etc.). Data sources 306 may also define KPI mappings and other associated data.

Scorecard architecture 300 may include scorecard presentation 310. This may be an application to deploy scorecards, customize views, coordinate distribution of scorecard data, and process web-specific applications associated with the performance evaluation process. For example, scorecard presentation 310 may include a web-based printing system, an email distribution system, and the like. A user interface for scorecard presentation 310 may also include an overview of available scorecards for a subscriber to select from. Scorecard presentation 310 may further include a matrix or a list presentation of the scorecard data. The scorecard presentation and one or more zones for other applications may be displayed in an integrated manner.

Grouping module 320 is configured to interact with scorecard engine 308, scorecard presentation 310, other applications 318, and manage determination of suitable reports for selected metrics, categorize the reports based on type and layout features, generate a list of available report definitions, and assign the list to the selected metrics. As mentioned previously, coordinating subordinate reports can be very difficult for heterogeneous metrics. Below are two examples of a scorecard with homogeneous and heterogeneous KPIs.

Homogeneous Scorecard with a Homogeneous Subordinate Report:

| KPI | Actual | Target | Status |
| --- | --- | --- | --- |
| Unit Sales in Korea | 100 | 90 | On Target |
| Unit Sales in Canada | 100 | 99 | On Target |
| Unit Sales in United States | 100 | 29 | On Target |

In the scorecard application, selecting any row can send context to a subordinate report that might show line item detail of the dates when units are sold. As a parameterized report, complexity does not significantly vary if additional homogenous KPIs are added.

Heterogeneous Scorecard with a Heterogeneous Subordinate Report:

| KPI | Actual | Target | Status |
| --- | --- | --- | --- |
| Sales in Korea | $100.3 | $90.0 | On Target |
| Product Defects Per Million | 32.3 | 20 | Off Target |
| Customer Support Utilization | 45% | 44% | On Target |

Each KPI in this scorecard uses a different schema and data source and requires a different set of subordinate reports. Sales in Korea (in 1000's US Dollars) may require subordinate reports of sales in different currencies and potentially geo-spatial visualizations of the data. Product defects per million may need to show trends of defects over time and line-item detail with photographs and rich documentation of the issue reports. Thus, the heterogeneous scenarios can be geometrically more complex and problematic than the homogeneous scenarios in terms of report definition, parameterization, and layout.

Other applications 318 may include any application that receives data associated with a report parameter and consumes the data to provide a report, perform analysis, provide alerts, perform further calculations, and the like. The data associated with the report parameter includes content data and metadata. Other applications may be selected based on the report parameter, a subscriber request, or a user interface configuration. The user interface configuration may include a subscriber credential or a subscriber permission attribute. Other applications 318 may include a graphical representation application, a database application, a data analysis application, a communications application, an alerting application, or a word processing application.

Figure 4:
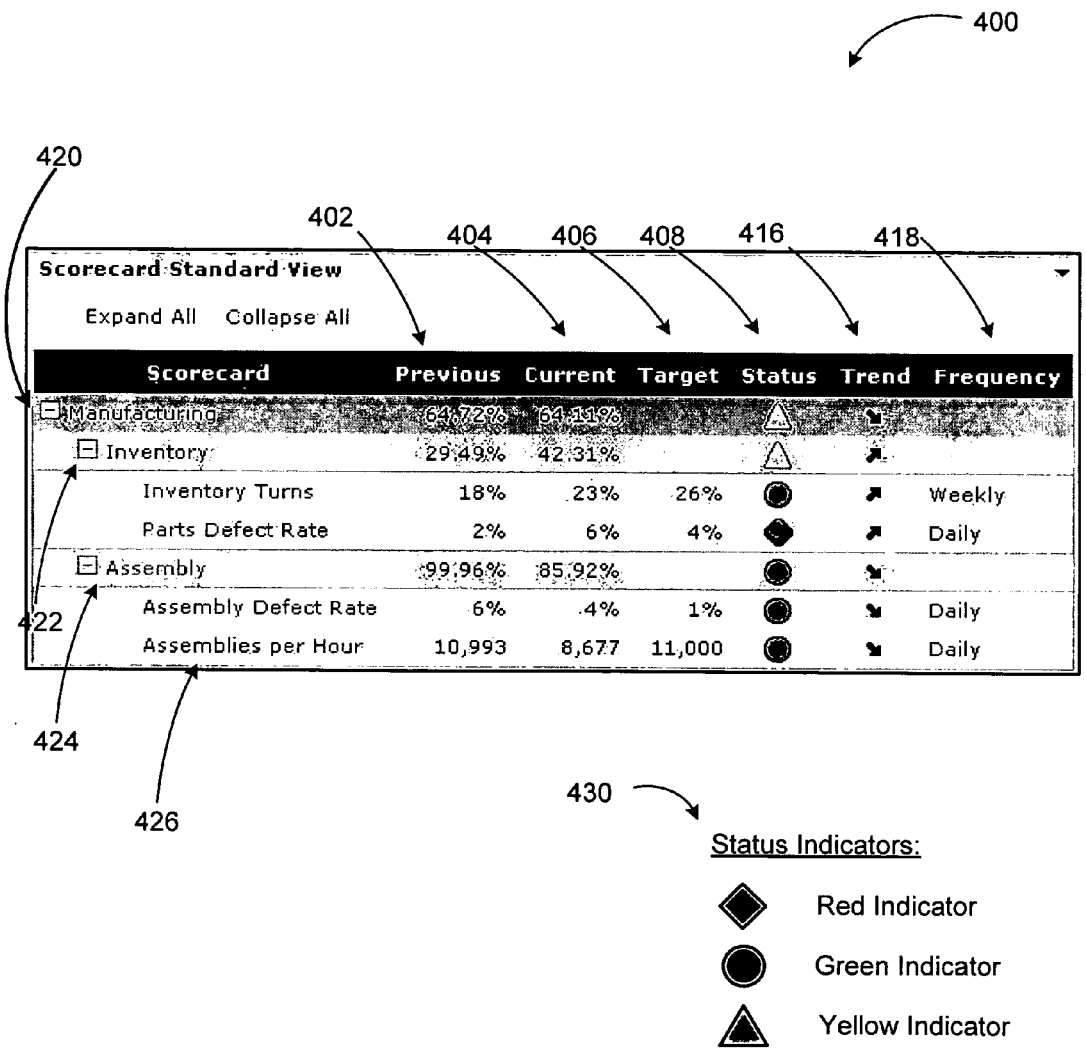
FIG. 4 illustrates a screenshot of an example scorecard.

FIG. 4 illustrates a screenshot of an example scorecard. As explained before, Key Performance Indicators (KPIs) are specific indicators of organizational performance that measure a current state in relation to meeting the targeted objectives. Decision makers may utilize these indicators to manage the organization more effectively.

When creating a KPI, the KPI definition may be used across several scorecards. This is useful when different scorecard managers might have a shared KPI in common. The shared use of KPI definition may ensure a standard definition is used for that KPI. Despite the shared definition, each individual scorecard may utilize a different data source and data mappings for the actual KPI.

Each KPI may include a number of attributes. Some of these attributes include frequency of data, unit of measure, trend type, weight, and other attributes. The frequency of data identifies how often the data is updated in the source database (cube). The frequency of data may include: Daily, Weekly, Monthly, Quarterly, and Annually.

The unit of measure provides an interpretation for the KPI. Some of the units of measure are: Integer, Decimal, Percent, Days, and Currency. These examples are not exhaustive, and other elements may be added without departing from the scope of the invention.

A trend type may be set according to whether an increasing trend is desirable or not. For example, increasing profit is a desirable trend, while increasing defect rates is not. The trend type may be used in determining the KPI status to display and in setting and interpreting the KPI banding boundary values. The trend arrows displayed in scorecard 400 indicate how the numbers are moving this period compared to last. If in this period the number is greater than last period, the trend is up regardless of the trend type. Possible trend types may include: Increasing Is Better, Decreasing Is Better, and On-Target Is Better.

Weight is a positive integer used to qualify the relative value of a KPI in relation to other KPIs. It is used to calculate the aggregated scorecard value. For example, if an Objective in a scorecard has two KPIs, the first KPI has a weight of 1, and the second has a weight of 3 the second KPI is essentially three times more important than the first, and this weighted relationship is part of the calculation when the KPIs' values are rolled up to derive the values of their parent Objective.

Other attributes may contain pointers to custom attributes that may be created for documentation purposes or used for various other aspects of the scorecard system such as creating different views in different graphical representations of the finished scorecard. Custom attributes may be created for any scorecard element and may be extended or customized by application developers or users for use in their own applications. They may be any of a number of types including text, numbers, percentages, dates, and hyperlinks.

One of the benefits of defining a scorecard is the ability to easily quantify and visualize performance in meeting organizational strategy. By providing a status at an overall scorecard level, and for each perspective, each objective or each KPI rollup, one may quickly identify where one might be off target. By utilizing the hierarchical scorecard definition along with KPI weightings, a status value is calculated at each level of the scorecard.

First column of scorecard 400 shows example elements perspective 420 "Manufacturing" with objectives 422 and 424 "Inventory" and "Assembly" (respectively) reporting to it. Second column 402 in scorecard 400 shows results for each measure from a previous measurement period. Third column 404 shows results for the same measures for the current measurement period. In one embodiment, the measurement period may include a month, a quarter, a tax year, a calendar year, and the like.

Fourth column 406 includes target values for specified KPIs on scorecard 400. Target values may be retrieved from a database, entered by a user, and the like. Column 408 of scorecard 400 shows status indicators.

Status indicators 430 convey the state of the KPI. An indicator may have a predetermined number of levels. A traffic light is one of the most commonly used indicators. It represents a KPI with three-levels of results—Good, Neutral, and Bad. Traffic light indicators may be colored red, yellow, or green. In addition, each colored indicator may have its own unique shape. A KPI may have one stoplight indicator visible at any given time. Indicators with more than three levels may appear as a bar divided into sections, or bands. Column 416 includes trend type arrows as explained above under KPI attributes. Column 418 shows another KPI attribute, frequency.

Figure 5:
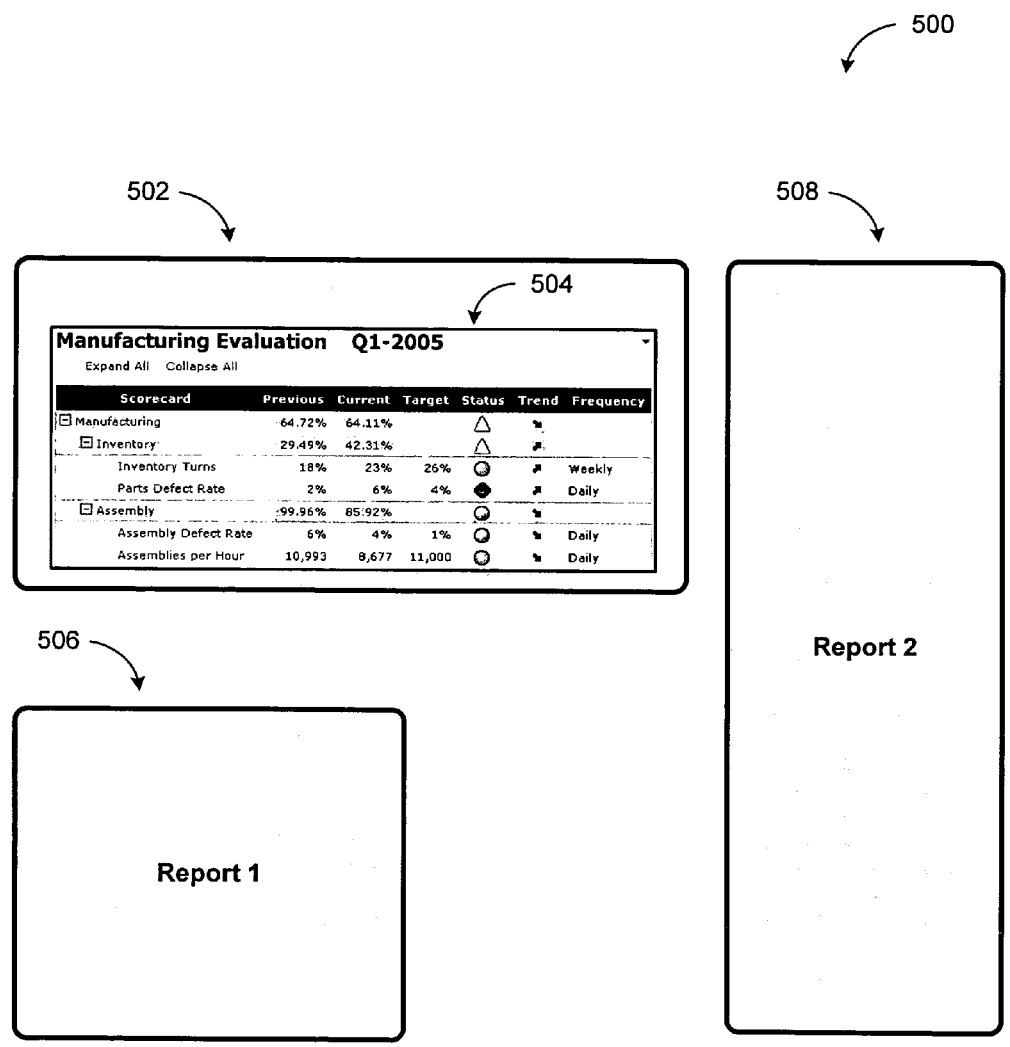
FIG. 5 illustrates a conceptual report view outline where different types of reports may be presented for heterogeneous metrics according to embodiments.

FIG. 5 illustrates a conceptual report view outline where different types of reports may be presented for heterogeneous metrics according to embodiments. While reports based on scorecard metrics may be presented in individual application UIs, multiple reports may also be presented in a combined UI along with a presentation of the scorecard itself. In diagram 500, scorecard application UI 502 includes scorecard 504 titled "Manufacturing Evaluation" for Q1 of 2005. Scorecard 504 includes hierarchically structured metrics (KPIs). Reports may be generated based on any one or a combination of the KPIs of scorecard 504. Where scorecard 504 includes heterogeneous KPIs, different types of reports may be generated for each KPI. Each type of report may also have its own layout features.

For example, report 1 in report view UI 506 may include a chart based on one of the KPIs, and therefore require a relatively proportional display area. Report 2 in report view UI 508 may be a transaction list requiring an elongated display as opposed to report 1. By assigning lists of available report definitions to the KPIs, report view layouts may be associated across metrics and physical layout of the scorecard.

Embodiments are not limited to the example scorecard layouts, report types, and views described above. Definition and instantiation of metric-based report grouping may be provided in many other ways using the principles described herein.

Figure 6:
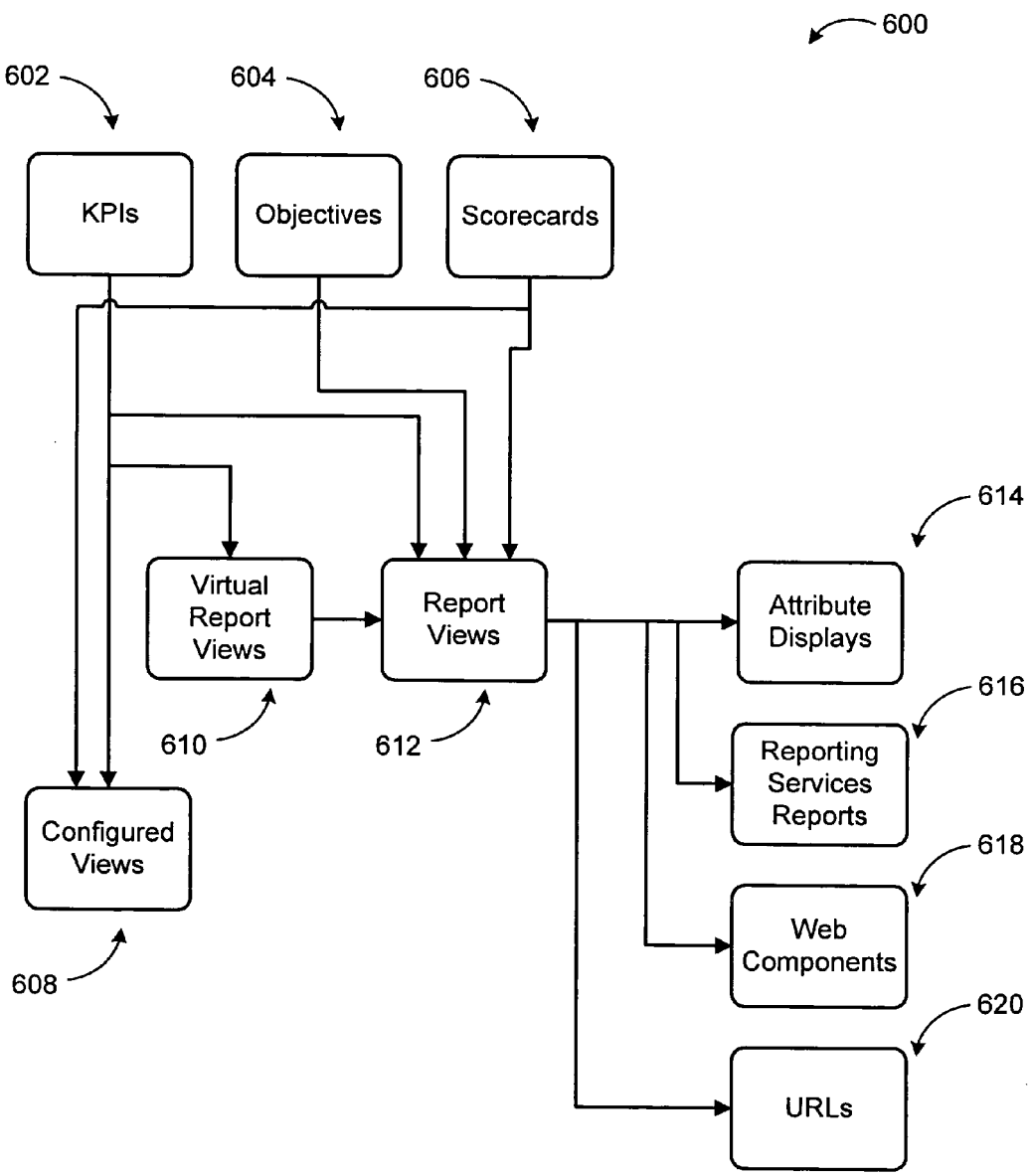
FIG. 6 is a diagram illustrating interactions between different components of a scorecard system for report generation purposes.

FIG. 6 is a diagram illustrating interactions between different components of a scorecard system for report generation purposes. Core elements of a scorecard system include KPIs 602, Objectives 604, and scorecards 606. All three of these elements may have a multitude of report views 612 associated with them. In addition, KPIs 602 and scorecards 606 may have configured views 608 associated with them. It should be noted that these are views on scorecards showing different properties, e.g. one view might show owner and frequency of KPI update, another might show the name of the data source and the database administrator. The underlying definitions of the scorecards typically remain the same, the report is different in each case. KPIs 602 may also have virtual report views, which are employed to prevent repetitiveness for report views when multiple similar KPIs are used in a scorecard. Virtual report views may include all of the attribute information in their definition such that a single report view is created and updated for each one of the similar KPIs.

Report views 612 may include attribute displays 614, reporting services reports 616 (e.g. transaction lists), web components 618 (e.g. pivot charts), URLs 620, and the like. Each report view includes information associated with its components in its definition. By grouping the report views based on their types (components) and assigning them to a selected core component, heterogeneous metrics can be handled by the scorecard system in a seamless fashion.

Figure 7:
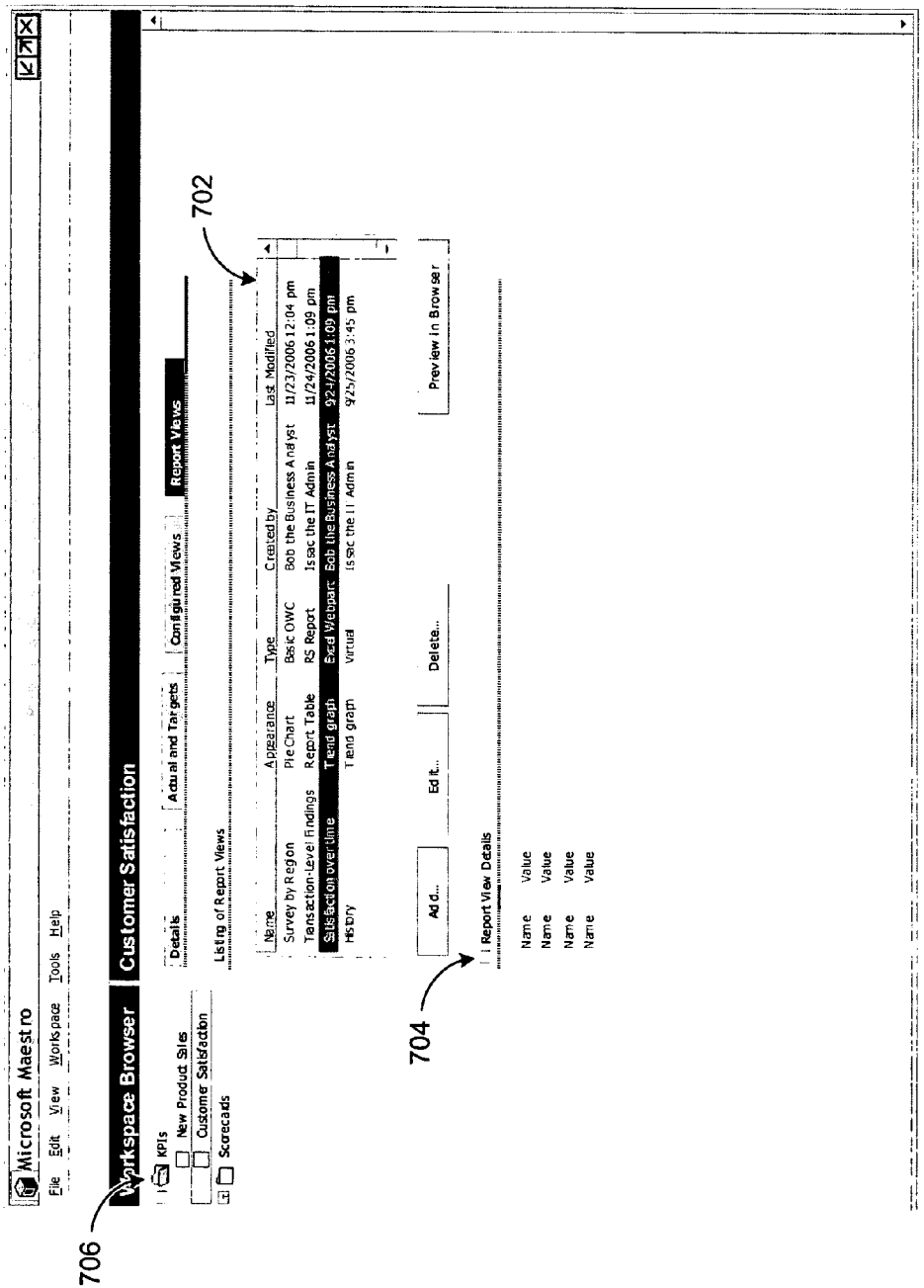
FIG. 7 illustrates a screenshot of an example report view inspector User Interface (UI) in a scorecard application.

FIG. 7 illustrates a screenshot of an example report view inspector UI in a scorecard application. Workspace browser portion 706 of the UI includes a listing of KPIs and scorecards available to a subscriber in the scorecard application. The KPIs and scorecards (as well as other elements such as Objectives) may be presented in a listing tree format, a simple listing format, and any other format known in the art.

Upon selection of one of the items (e.g. Customer Satisfaction) in the workspace browser portion 706, information associated with the selected item is presented in the adjacent portion of the UI. The editor UI may provide information such as details of the selected item, actuals and targets included in the selected KPI or scorecard, configured views of the KPI or scorecard, and report views associated with the selected KPI or scorecard. Listing of report views 702 is an example showing available reports associated with the selected item. As shown in the example screenshot, four reports are available for the selected KPI. Attributes of each report view such as report type, appearance, name, owner, last modification date, and the like, may be listed. More details for each report view may be provided in details portion 704.

The selected KPI is assigned the listed report views and their attributes. Accordingly, the report views of this particular KPI are independent of the scorecard configuration and may be transferred to another scorecard along with the KPI, updated without having to recreate each of the reports when data is updated, and so on.

Figure 8:
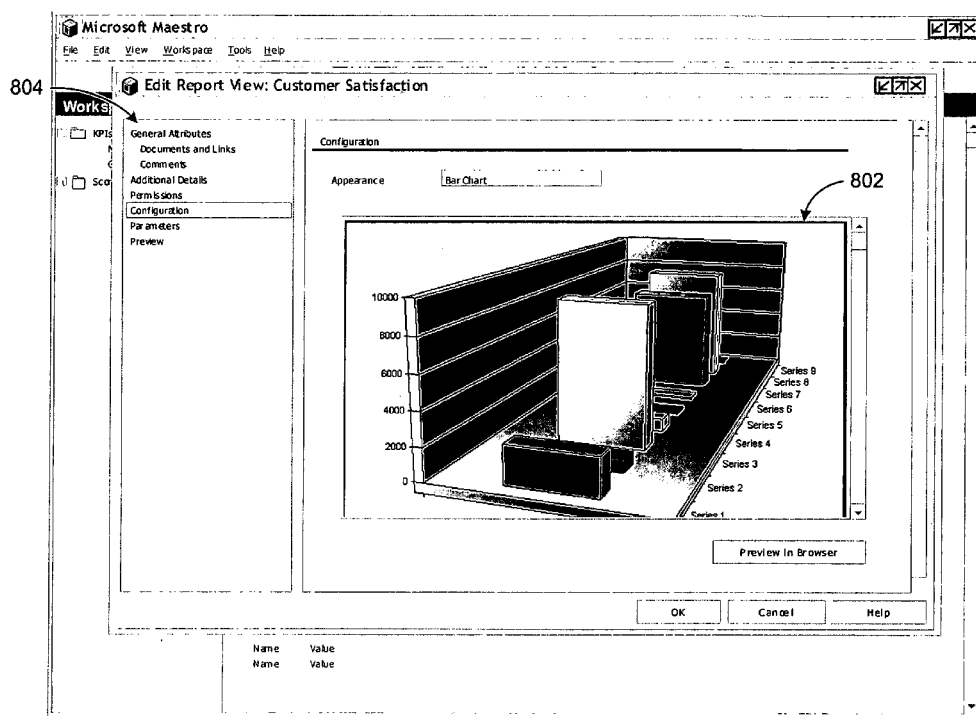
FIG. 8 illustrates a screenshot of an example report view editor UI in a scorecard application.

FIG. 8 illustrates a screenshot of an example report view editor UI in a scorecard application. According to some embodiments, a scorecard application with metric-assigned report view definition capability may provide a number of default report views for a selected metric. Once the default report view have been proposed, the subscriber may be provided with an option to modify those report views, add new ones, or remove some of them.

Example report view editor UI includes a bar chart style report as shown in preview window 802. Another portion (804) of the report view editor UI includes a listing of attributes associated with the selected report view such as documents and links, comments, permissions, configuration, parameters, and the like. Each of these attributes may be modified depending on the permission level of the subscriber.

The example implementations of report views, scorecards, and UIs in FIGS. 4 through 8 are intended for illustration purposes only and should not be construed as a limitation on embodiments. Other embodiments may be implemented using the principles described herein.

Figure 9:
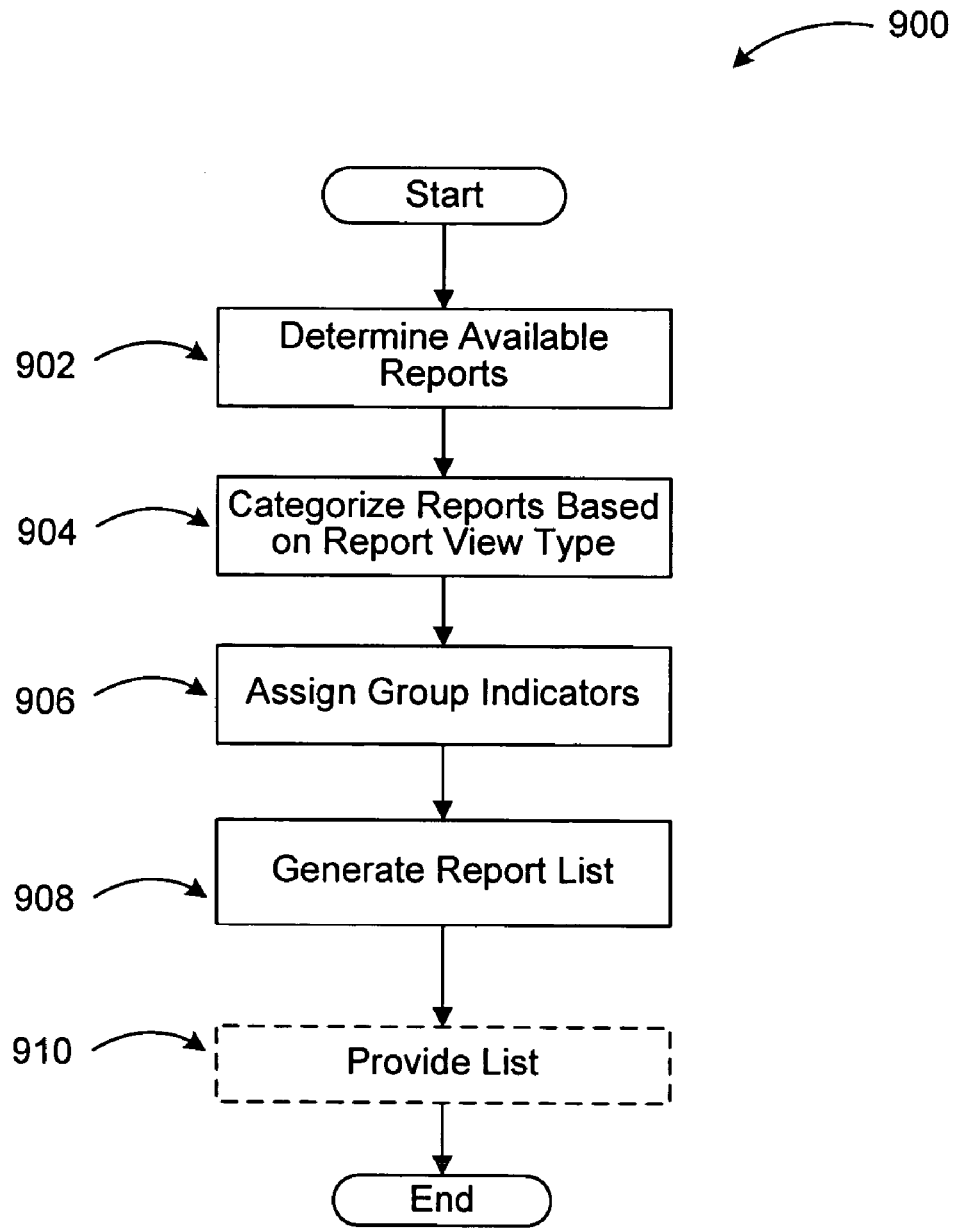
FIG. 9 illustrates logic flow diagram for a process of using report definition lists assigned to scorecard metrics.

FIG. 9 illustrates logic flow diagram for a process of using report definition lists assigned to scorecard metrics. Process 900 may be implemented in a business logic application.

Process 900 begins with operation 902, where available reports are determined. Available reports are determined based on an evaluation of suitable reports for selected scorecard elements such as KPIs, Objectives, and the like. Report type for the data included in the element, features of a report presentation layout associated with the report, and the like, are taken into consideration when determining the available reports. Processing advances from operation 902 to operation 904.

At operation 904, the reports are categorized based on report view type(s). As mentioned previously, different report types may be generated based on the same scorecard element. For example, a scorecard element representing manufacturing defects may be associated with various charts, manufacturing records, or even images of product defects. Each category of reports may include a number of reports based on the data (different time periods, organizational units, etc.). Processing moves from operation 904 to operation 906.

At operation 906, group indicators are assigned to the report definitions. Group indicators may be used to identify types of available reports for a selected scorecard element. For example, ordered numbers or letters may be assigned to report types such as charts, transaction lists, URLs, and the like. If multiple reports are to be generated under one or more categories, the reports for that category can be identified by the same group indicator. Processing then proceeds to operation 908.

At operation 908, a report definition list is generated. The report definition list includes available report definitions for the selected scorecard element by category. The report list may be made part of the selected scorecard element allowing association of reports across metrics and physical layouts of the scorecard. Processing advances from operation 908 to optional operation 910.

At optional operation 910, the report definition list is made available for consumption by the scorecard application or another application for report presentation, query-based searches, and similar purposes. After operation 910, processing moves to a calling process for further actions.

The operations included in process 900 are for illustration purposes. Providing coordinated reports for heterogeneous metrics by assigning report definition lists to the metrics may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for using parameterized subordinate reports in a scorecard system, the method comprising:
   determining a plurality of report definitions associated with a scorecard element based on an attribute of the scorecard element, the scorecard element being associated with an actual value, a target value, and a status indicator;
   determining layout features for each report definition of the plurality of report definitions, wherein determining the layout features comprises determining which configuration views are associated with each report definition, the configuration views being configured to show different properties of the scorecard element, the properties comprising owner information, data source information, and scorecard update frequency information;

categorizing the plurality of report definitions based on a report type and the layout features for each report definition; and assigning selected report definitions to the scorecard element by category.

2. The method of claim 1, further comprising:
generating a listing document that includes a list of the selected report definitions.

3. The method of claim 2, further comprising:
providing the listing document to another application for one of generating a report presentation and executing a query.

4. The method of claim 1, wherein assigning selected report definitions comprises assigning selected report definitions that are determined based on one of a default selection criterion and a user selection.

5. The method of claim 1, wherein categorizing the plurality of report definitions based on the report type and the layout features for each report definition comprises categorizing the plurality of report definitions based on the report type that includes at least one from a set of a document, a chart, a transaction list, a spreadsheet, and a link.

6. The method of claim 5, further comprising:
determining the layout features for a report definition based on the report type of the same report definition.

7. The method of claim 1, wherein determining the plurality of report definitions associated with the scorecard element comprises determining the plurality of report definitions associated with the scorecard element that includes one of a Key Performance Indicator (KPI), an Objective, and a scorecard.

8. The method of claim 7, further comprising generating the report definitions dynamically when the scorecard is modified.

9. The method of claim 1, further comprising:
storing the assigned report definitions with scorecard information.

10. A computer-readable storage medium having computer executable instructions which when executed perform a method for using report definitions capable of handling heterogeneous metrics in a scorecard system, the method executed by the computer executable instructions comprising:

determining a first group of available report definitions for a scorecard metric based on an attribute of the metric, the scorecard metric being associated with an actual value, a target value, and a status indicator;

categorizing the first group of report definitions based on a report type and a layout feature associated with each report definition, the layout feature being associated with configuration views associated with the scorecard metric, the configuration views being configured to show different properties of the scorecard metric, the properties comprising owner information, data source information, and scorecard update frequency information;

selecting a second group of report definitions from the first group;

generating a list of the second group of report definitions, wherein the list is assigned to the scorecard metric; and providing the list of the second group of report definitions to another application for report presentation, the other application being configured to compute scorecard metrics and provide a scorecard presentation based on the computed scorecard metrics.

11. The computer-readable storage medium of claim 10, wherein selecting the second group of report definitions comprises selecting the second group of report definitions based on a set of default criteria.

12. The computer-readable storage medium of claim 10, wherein determining the first group of available report definitions for the scorecard metric based on the attribute of the metric comprises determining the first group of available report definitions for the scorecard metric based on the attribute of the metric including a data type for the metric.

13. The computer-readable storage medium of claim 10, providing the list to the application for report presentation comprises providing the list to a scorecard application.

14. The computer-readable storage medium of claim 10, wherein determining the first group of available report definitions for the scorecard metric based on the attribute of the metric comprises determining the first group of available report definitions wherein each report definition includes at least one from a set of: a report type, a permission level, a report layout, a link to source data, and a configuration.

15. A system for assigning report definitions to scorecard elements, the system comprising:

a memory storage comprising a report definition module; and a processing unit coupled to the memory storage, wherein the processing unit is configured to:

determine a group of available report definitions for a scorecard element based on a type of data associated with the scorecard element, the scorecard element being associated with an actual value, a target value, and a status indicator;

categorize the report definitions based on a report view presentation format, the report view presentation format being associated with various configuration views corresponding to the scorecard element, the configuration views being configured to show different properties of the scorecard metric, the properties comprising owner information, data source information, database information, and scorecard update frequency information; and assign the categorized report definitions to the scorecard element such that a correlation between the scorecard element and the group of report definitions is independent from a scorecard configuration.

16. The system of claim 15, wherein the report definition module is further configured to select a subset of the group of available report definitions based on one of a user input and a default selection.

17. The system of claim 15, wherein the report definition module is further configured to enable a subscriber to modify at least one attribute of each of the report definitions.

18. The system of claim 15, further comprising a scorecard application is configured to:
compute scorecard metrics and provide a scorecard presentation based on the computed scorecard metrics; and
generate a report view layout based on selected ones of the report definitions.

19. The system of claim 15, wherein the report view presentation format includes a size and a shape of the report view area.

20. The system of claim 15, wherein the report definition module is integrated with a scorecard application.

* * * * *